(Model.)

T. F. HALL.
DRIVE CHAIN.

No. 297,793. Patented Apr. 29, 1884.

WITNESSES
Villette Anderson.
Philip C. Masi.

INVENTOR
T. F. Hall,
by J. A. Lehmann,
his ATTORNEY

UNITED STATES PATENT OFFICE.

THEODORE F. HALL, OF MARIETTA, OHIO, ASSIGNOR, BY DIRECT AND MESNE ASSIGNMENTS, OF PART TO ALFRED J. RICHARDS, W. E. CONNER, AND GEORGE W. LOVELL, ALL OF SAME PLACE.

DRIVE-CHAIN.

SPECIFICATION forming part of Letters Patent No. 297,793, dated April 29, 1884.

Application filed October 9, 1882. (Model.)

*To all whom it may concern:*

Be it known that I, THEODORE F. HALL, a citizen of the United States, and a resident of Marietta, in the county of Washington and State of Ohio, have invented a new and valuable Improvement in Chain-Links; and I do hereby declare that the following is a full, clear, and exact description of the construction and operation of the same, reference being had to the annexed drawings, making a part of this specification, and to the letters and figures of reference marked thereon.

My invention relates to an improvement in drive-chain links; and it consists in a link provided with cylindrical side bars having projections extending into the inlet of the hook, a cylindrical bar at one end of the link of uniform size with the side bars and provided at the opposite end with an open hook, the throat or opening of which is curved, and the socket of which is straight on the side next to the end bar, but curved on the side toward the hook end, as will be more fully described hereinafter.

Figure 1:
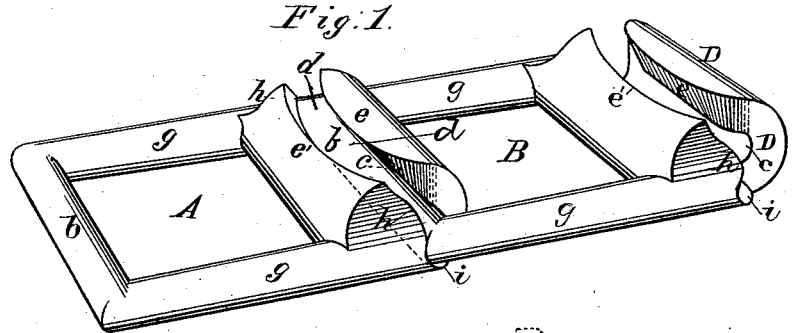
Figure 2:
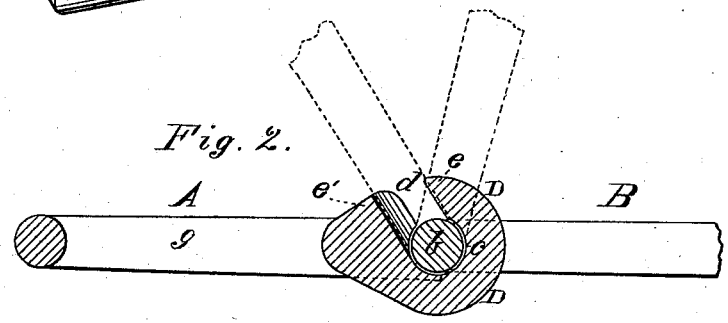
Figure 3:
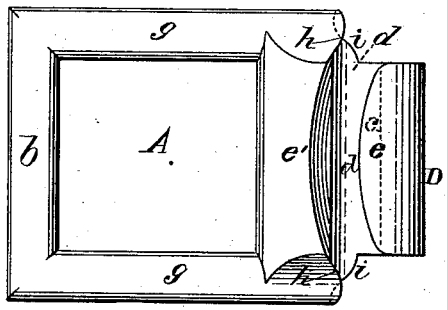

Figure 1 is a perspective showing two links coupled together. Fig. 2 is a vertical longitudinal section of two links coupled together, the positions one of the links assumes in coupling and uncoupling being shown in dotted lines. Fig. 3 is a plan view of a single link.

A B represent two links of a drive-chain, each of which has the side bars, $g$, and end bar, $b$, made round or circular, and of the same or about the same size. The hook or coupling end of each link is thickened and increased in size, as shown, for the purpose of forming the hook D and giving the link additional strength at this end. The outer ends of this hook D are made flat, as shown in Fig. 3, and the length of the hook is less than the width of the link. Formed at each corner of the link is the projection $i$, which extends outward far enough to form a part of the end and bottom of the socket of the hook. These projections serve as stops to prevent the links from doubling back upon each other too far, and serve to assist in coupling the links together by acting as guides. The outer side, $c$, of the socket, where the end bar, $b$, has its bearing, is made straight transversely of the link from one side to the other and concave vertically, so as to correspond to the shape of the bar $b$, as shown in Figs. 2 and 3; but the upper rear sides, $e$ $e'$, of the socket or hook are curved so as to form a curved opening or slot, $d$. At each end of this curved slot or opening $d$ is formed a suitable projection or rounded extension, $h$, which causes the link to be given a curved or twisted motion as it is being inserted into the hook D.

Heretofore straight instead of curved slots have usually been used in making detachable links. In using straight slots, the side bars of the links have generally to be cut or reduced, and this reduces the strength of the links very materially, while by using the curved slots the points of the hooks can be passed without notching or reducing the side bar in any manner, thus securing the full size of the side bar. There is no hook in any one point of the curved slot, as the side bar which passes through the curved slot is of the same size as the pivot-bar in the hook. The curved slot also serves to prevent any possibility of the links coming accidentally apart, no matter in what position they may be placed.

Having thus described my invention, I claim—

A drive-chain link consisting of side bars, $g$ $g$, straight bar $b$ at one end, and open hook D at the opposite end, the socket or bearing in which the pivot-bar works being straight and its throat or slot being curved—that is to say, convex on the side next to the pivot of the hook and concave on the opposite side next to the end bar—and having the projections $i$ $i$, extending into said socket, substantially as shown and described.

In testimony that I claim the above I have hereunto subscribed my name in the presence of two witnesses.

THEODORE F. HALL.

Witnesses:
CHAS. H. NEWTON,
STEPHEN NEWTON.